US 9,338,167 B2

United States Patent
Han et al.

(10) Patent No.: US 9,338,167 B2
(45) Date of Patent: May 10, 2016

(54) SELF-SERVICE TERMINAL (SST) THIN CLIENT

(71) Applicant: NCR Corporation, Duluth, GA (US)

(72) Inventors: Richard Han, Angus (GB); Andrew Monaghan, Dundee (GB)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 14/194,081

(22) Filed: Feb. 28, 2014

(65) Prior Publication Data

US 2015/0249667 A1    Sep. 3, 2015

(51) Int. Cl.
*H04L 29/06* (2006.01)
*G07F 19/00* (2006.01)
*G06Q 20/18* (2012.01)

(52) U.S. Cl.
CPC ............ *H04L 63/10* (2013.01); *G06Q 20/18* (2013.01); *G07F 19/206* (2013.01); *G07F 19/209* (2013.01); *G07F 19/211* (2013.01); *H04L 67/42* (2013.01)

(58) Field of Classification Search
CPC ......... G06Q 20/18; H04L 67/42; H04L 63/10
See application file for complete search history.

(56) References Cited

U.S. PATENT DOCUMENTS

| | | | |
|---|---|---|---|
| 6,311,165 B1 | 10/2001 | Coutts et al. | |
| 6,672,505 B1 | 1/2004 | Steinmetz et al. | |
| 6,908,032 B1 | 6/2005 | Somers et al. | |
| 6,964,368 B1 | 11/2005 | Trelawney et al. | |
| 7,725,393 B2 | 5/2010 | Drummond et al. | |
| 8,100,323 B1 * | 1/2012 | Crews | G06F 21/57 235/379 |
| 8,281,985 B1 * | 10/2012 | Steinmetz et al. | 235/379 |
| 8,549,512 B1 * | 10/2013 | Vannatter | G06Q 10/00 717/168 |
| 2002/0099634 A1 * | 7/2002 | Coutts et al. | 705/35 |
| 2002/0104042 A1 * | 8/2002 | Wong et al. | 714/38 |
| 2005/0216888 A1 * | 9/2005 | Drummond et al. | 717/113 |
| 2008/0319903 A1 * | 12/2008 | Rossmann | 705/43 |
| 2009/0159661 A1 * | 6/2009 | Sanches | G06Q 40/00 235/379 |
| 2009/0204856 A1 * | 8/2009 | Sinclair et al. | 714/48 |
| 2011/0238572 A1 * | 9/2011 | McGraw et al. | 705/43 |

OTHER PUBLICATIONS

Fanfeng et al., Research and realization of the bank self-service terminal based on XFS standard, Dec. 2009, International Conference on Computer and Communications Security, pp. 7-9.*

* cited by examiner

*Primary Examiner* — Kenneth Chang
(74) *Attorney, Agent, or Firm* — Schwegman, Lundberg & Woessner

(57) ABSTRACT

Self-Service Terminal (SST) thin clients and operation thereof are provided. A SST includes an operating system (OS), and authorized thin-client application, and an authorized agent. The OS is configured to restrict execution on the SST to authorized applications. The authorized thin-client application is configured to access predefined peripheral devices within the SST and an authorized server. In an embodiment, the authorized agent is configured to connect to the authorized server to: manage updates to the OS received from the authorized server and receive customizations from the authorized server to configure the authorized thin-client application.

19 Claims, 4 Drawing Sheets

SELF-SERVICE TERMINAL (SST) THIN CLIENT

BACKGROUND

At bank branches, the bank provides a number of Automated Teller Machines (ATMs) and teller stations where customers can transact independent of tellers at the ATMs and where customers can transact with tellers at the teller stations.

The ATM hardware and software are closely controlled and monitored by the servicing organization of the bank. Network access outside the bank branch is restricted to just secure financial networks. Servicing engineers have to physically be present at each ATM to service that ATM even when the service required is related to a software asset.

The servicing organization may service multiple different bank branches and each bank branch may have different assets or a different configuration of assets (hardware and software) for each ATM within that bank branch.

This leads to highly coupled heterogeneous environments across bank branches and even within a same bank branch. The servicing organization has to deal with a client-centric servicing approach, requiring client-specific or even installation-specific (for a same client) experts. This is inefficient and costly to both the bank and the servicing organization.

Moreover, the client banks have begun to manage updates and replacements to their hardware and software assets because of security and expense issues associated with such tasks. So, asset updates are infrequent and any desired customization of the assets is done across the bank's entire fleet of assets, even though the banks desire the ability to move from their existing coarse-grain model of customization to a more fine-grain model of customization. With the present state of technology in the industry, the effort and expense to achieve these bank goals remain elusive.

SUMMARY

In various embodiments, Self-Service Terminal (SST) thin clients and techniques for operating SSTs as thin clients are provided.

According to an embodiment, a SST is provided that includes an operating system (OS), an authorized thin-client application, and an authorized agent. The OS is configured to restrict execution on the SST to authorized applications. The authorized thin-client application is configured to access predefined peripheral devices within the SST and an authorized server. The authorized agent is configured to connect to the authorized server and to manage updates to the OS received from the authorized server.

DETAILED DESCRIPTION

Figure 1:
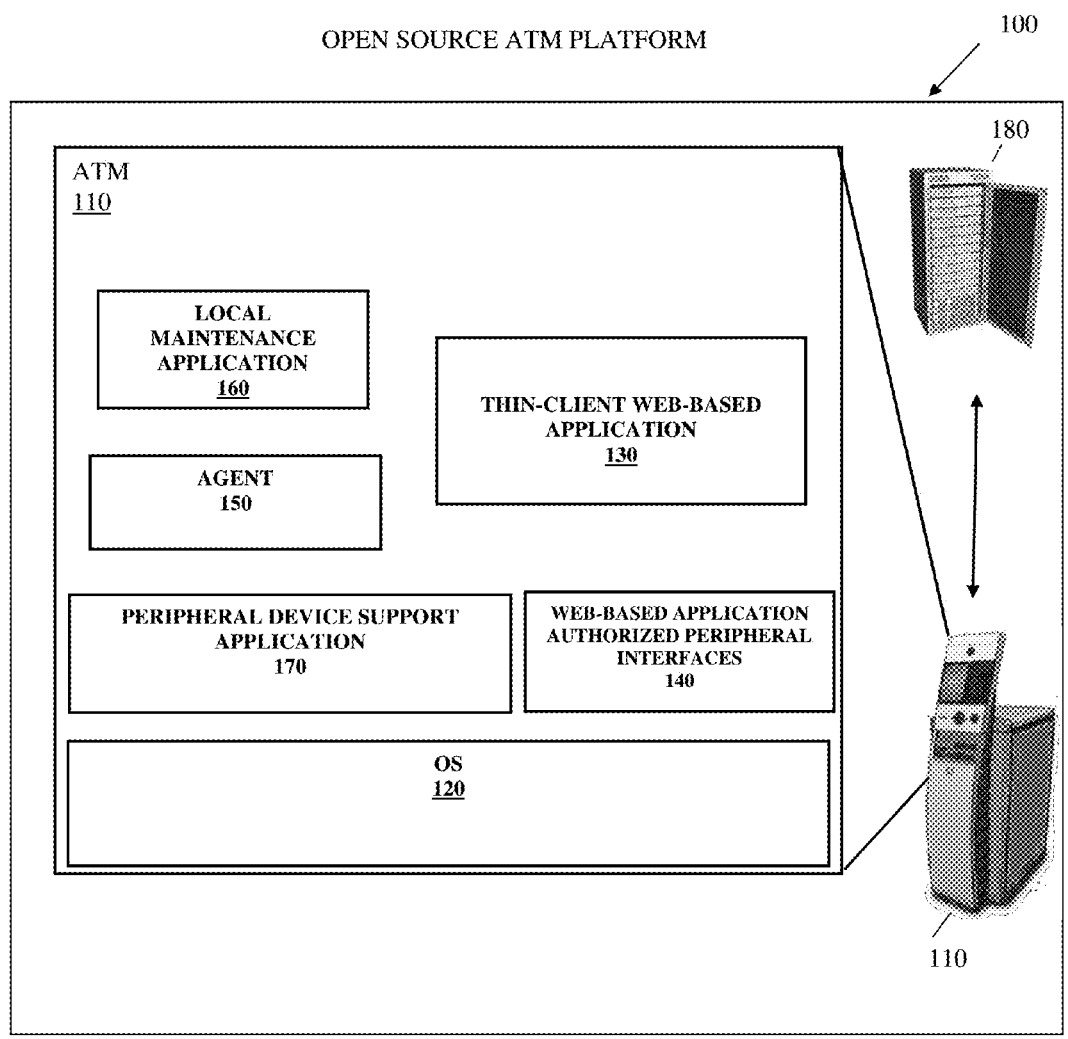
FIG. 1 is a diagram 100 for an open-source Automated Teller Machine (ATM) platform having thin client capabilities, according to an example embodiment.

FIG. 1 is a diagram 100 of an open-source Automated Teller Machine (ATM) platform having thin client capabilities, according to an example embodiment. The various components are illustrated and the arrangement of the components is presented for purposes of illustration only. It is to be noted that other arrangements with more or less components are possible without departing from the ATM thin client teachings presented herein and below.

The ATM 110, SST, methods, and system presented herein and below for SST thin clients and operation thereof can be implemented in whole or in part in one, all, or some combination of the components shown with the diagram 100. The techniques and methods are programmed as executable instructions in memory and/or non-transitory computer-readable storage media and processed on one or more processors associated with the various components. Moreover, the ATM 110 is shown in greatly simplified form, illustrating primarily (but not exclusively), just the components that are enhanced or that are necessary for comprehending the teachings presented herein.

The discussion that follows represents one embodiment of the invention for an embodiment having and operating an ATM thin client application 130. It is noted that any SST, such as a kiosk, or any device can benefit from the teachings presented herein; some of which are discussed with reference to the FIGS. 2-4. Thus, the description that follows below is but one embodiment of the invention and it not intended to exclusively limit the invention to only financial transactions at financial facilities.

The ATM 110 includes: an operating system (OS) 120, a thin-client web-based application 130, a web-based application authorized peripheral interfaces 140, an agent 150, a local maintenance application 160, and a peripheral device support application 170. The ATM 110 also communicates with an authorized server 180.

In an embodiment, the OS 120 is Android®.

In an embodiment, the OS 120 is selected from one of: Tizen®, Suse®, Linux, UNIX®, and open source OSs.

The OS 120 is "vanilla" in the sense that it is a baseline scaled down OS image build for the ATM's motherboard with security and configured resilient enhancements.

The thin-client web-based application 130 is an application that partially includes locally (local to ATM 110) installed code and partially executes/displays remote web content received from the server 180 (a hybrid-type application). Thus, the thin-client web-based application 130 supports cross-platform communications, such that communications directed to the local processing environment associated with the OS 120 can occur as well as communications directed to interfacing with a remote processing environment associated with the authorized server 180.

The thin-client web-based application 130 has a browser engine that provides web-based processing capabilities, such as running of scripts (e.g., JavaScript®, etc.) and provides a web-based browser platform.

The thin-client web-based application 130 provides a cross-platform interface between the ATM 110 and the authorized server 180 to which the ATM 110 communicates with. The authorized server 180 can deliver to the thin-client web-based application 130 scripts for processing by the thin-client web-based application 130 and the thin-client web-based application 130 can communicate back to the authorized server 180 using browser-based communications, such as but not limited to Hypertext Transfer Protocol (HTTP) over a Secure Socket Layer (SSL) (referred to as HTTPS).

The thin-client web-based application 130 has a customer-facing web-based interface that presents on one or more screens of a display of the ATM 110 for a customer to conduct ATM transactions with an external financial system (to which the authorized server is in secure communications with). This provides a rich customer experience with web-based ATM transactional interfaces (such as through the browser engine of the thin-client web-based application 130) and provides a variety of customization features; all of which have heretofore not been capable on traditional ATMs.

The thin-client web-based application 130 also includes an API for interaction with the authorized server 180 (external to the processing environment of the ATM 110) and an API for interaction with web-based application authorized peripheral interfaces 140 and, in some instances, the authorized agent 150 (as discussed below). The thin-client web-based application 130 is restricted, for security reasons, to having access only to the peripherals for which the web-based application authorized peripheral interfaces 140 provide access to.

In an embodiment, the thin-client web-based application 130 includes an enhanced and customized open source web browser as its browser engine, such as an enhanced Android-based browser (Chrome/Webkit). The browser engine provides interaction with users of the ATM and can be implemented using as a Rich Internet Application (RIA), using Google Web Toolkit (GWT) or other programming languages.

Some, of the web-based application authorized peripheral interfaces 140 may be native interfaces to native peripherals associated with the ATM 110 (e.g., encrypted Personal Identification Number (PIN) keypad, card reader, valuable-media dispenser (dispensing currency, value tickets, virtual currency to inserted media, and the like, monitors, printers (for receipts), etc.). By "native" it is meant, that the original peripheral interfaces were directed to existing device drivers for peripherals that a legacy ATM application (replaced herein by the thin-client web-based application 130) had authorized access to.

In some embodiments, these original peripheral interfaces are capable of being ported to the processing environment of the ATM 110 using their original source code (which may need to be recompiled and/or linked on the new OS 120), such that the port results in a number of the web-based application peripheral interfaces 140. In other embodiments, these original peripheral interfaces ported to the processing environment of the ATM 110 are rewritten for the new environment.

In an embodiment, the original peripheral interfaces are rewritten to include device driver support for the peripherals to which they interface, such that the OS 120 lacks a device driver to those peripherals and access to those peripherals occur only through the execution of the web-based application peripheral interfaces 140 acting as "soft" drivers for access to the peripherals.

So, the thin-client web-based application 130 peripherals associated with the web-based application peripheral interfaces 140 are sandboxed to maintain and ensure a secure processing environment within a container for the thin-client web-based application 130.

The web-based application peripheral interfaces 140 provide the thin-client web-based application 130 with device access and transacting for such things as Europay MasterCard and Visa (EMV) processing to conduct financial transactions at the ATM 110 utilizing the authorized server 180.

The peripheral device support application 170 may also include limited authorized access to the peripherals that the thin-client web-based application 130 can access (130 only though the web-based application peripheral interfaces 140) and, perhaps, access to peripherals or ports that are inaccessible to the thin-client web-based application 130 (support peripherals, perhaps used by service engineers for other tasks in maintaining and servicing the ATM 110, such as monitors, flash devices, tablets, etc.). In some cases, the peripheral device support application 170 also operates as soft device drivers for the peripherals to which it interacts, such that the OS 120 lacks device driver support for those peripherals.

The peripheral device support application 170 provides services, error logging, settings management, and the like for its accessible peripherals. The peripheral device support application 170 also interacts with the authorized agent 150 to provide status on the peripherals and metrics about the peripherals to the authorized agent 150.

In an embodiment, the peripheral device support application 170 is implemented as one or more independent Dalvik executables executed by an Android® OS 120 (in a Dalvik Virtual Machine (VM)).

Similar to the peripheral device support application 170, the local maintenance application 160 interacts with the authorized agent to provide status information regarding the thin-client web-based application 130 and metrics. Moreover, the local maintenance application 160 provides a configuration User Interface (UI) for configuring the OS 120 and/or the local maintenance application 160. The local maintenance application 160 also provides mechanism for acquiring diagnostics and running tests on the components of the ATM 110.

The local maintenance application 160, the web-based application peripheral interfaces 140, and the peripheral device support application 170 could have the ability to directly communicate with the authorized server 180 (such as for authorization capabilities). However, 140, 160, and 170 have a capability to offer a majority of their function without access to server 180. The local maintenance application 160 and the peripheral device support application 170 can communicate with the thin-client web-based application 130 (for example, to inform the thin-client web-based application 130 that a card has been inserted, or that dispensed cash has been taken—events from the connected devices are passed up to the thin-client web-based application 130).

Any communication with the external server 180 must originate from the thin-client web-based application 130 and/or the authorized agent 150. Any communication from the local maintenance application 160 and the peripheral device support application 170 with the thin-client web-based application 130 must occur through the authorized agent 150.

All communication between the thin-client web-based application 130 and components of the ATM 110 occurs through a secure API provided by the thin-client web-based application 130. Also, communications that do occur between the authorized agent 150 and the components of the ATM 110 can be done in a secure manner using cryptology and signature verification. Such that should a component be hijacked or modified in an unauthorized manner, the thin-client web-based application 130 can detect an invalid communication and reject that communication. Similarly, any cryptology and signature validation that would normally take place between peripherals and an ATM application (the one performing financial transactions) can remain unchanged in the thin-client web-based application 130 and the peripherals to which the thin-client web-based application 130 has access (through the web-based application peripheral interfaces 140).

The authorized agent 150 communicates (can be based on trust between the components of the ATM 110 or can be securely using encrypted communications and/or key/signature validation) with the thin-client web-based application 130. Moreover, the authorized agent 150 secure communicates with the authorized server 180.

The authorized agent 150 provides a number of capabilities within the ATM 110. For example, the authorized agent 150 can force an update to the OS 120, which may actually also perform an update on the authorized agent 150. The authorized agent 150 can also update the other components of the ATM 110 including the thin-client web-based application 130.

The authorized agent 150 provides a mechanism for the authorized server 180 to deliver customizations to the thin-client web-based application 130, the OS 120, and/or the other components of the ATM 110.

In an embodiment, the authorized agent 150 receives customized settings that personalize the user presented web interface provided by the thin-client web-based application 130. These settings can be delivered to the authorized agent 150 from the authorized server 180 based on any desired configuration and any desired frequency, such as: for a particular bank branch, for a particular financial institution that a customer is transacting with though the ATM 110 (which may or may not be the same bank associated with the bank branch of the ATM 110), for a particular customer transacting at the ATM 110, for a particular class of customers to which the customer belongs, for a particular calendar day, for a particular promotion, and the like.

In an embodiment, the authorized agent 150 acts as a proxy between the thin-client web-based application 130 and the authorized server 180 (here the thin-client web-based application 130 may not have any direct access to the authorized server 180). This can be done to provide caching services, for example images of screen presentations provided in the web user interface within the thin-client web-based application 130 (reducing network bandwidth for the thin-client web-based application 130 to acquire redundant images from the authorized server on each customer transaction).

In an embodiment, the authorized agent 150 provides mechanisms for fault management, recovery services, and backup services to the components of the ATM 110.

In an embodiment, the authorized agent monitors for hardware and/or software component errors of the ATM 110 and reports these to the authorized server 180, which can then take remedial action (by issuing remote commands to the ATM 110 or by dispatching field engineers to service the ATM 110.

An example scenario for the operation of the ATM 110 is now presented for purposes of illustration and comprehension only and the example scenario is not intended to restrict the various embodiments presented herein to just this scenario.

A customer approaches ATM 110 to withdraw money from the customer's bank account. The presentations presented on the screens of the display of the ATM 110 are provided in a web-based format from the thin-client web-based application 130. Those presentations customized (logos, advertisement, placement and appearance of standard entry fields and buttons, etc.) for the bank associated with the ATM 110 based on the authorized agent 150 configuration actions for those customizations on the thin-client web-based application 130. The authorized agent 150 receiving those customizations from the authorized server 180.

The customer enters his/her bank card and his/her PIN into a card reader having and encrypted PINpad device. The card reader and the encrypted PINpad device interfaced to the thin-client web-based application 130 though the web-based application authorized peripherals 140 (interfaces to peripherals to which the thin-client web-based application 130 can communicate with within ATM 110). A customer identifier, bank and transaction details along with an encrypted PIN for the customer are provided from the web-based application authorized peripherals 140 to the thin-client web-based application 130.

The thin-client web-based application 130 transmits the information over a secure connection to the authorized server (which may route to a proper bank for some processing) and the authorized server returns an authorization for the amount to withdraw. The thin-client web-based application 130 then sends the amount to withdraw to a currency dispenser (though the web-based application authorized peripherals 140), the dispenser counts the currency equivalent to the amount, activates a dispenser door, and dispenses the currency to the customer (the dispenser may also independently validate the amount to withdraw is verified though cryptology used with the authorized server and not decipherable by the thin-client web-based application 130).

The activation of the components in the transaction and timing of the components may be logged and recorded for subsequent use by the local maintenance application 160 and the peripheral device support application 170.

In one case, for this example scenario the authorized agent 150 acts as a proxy between the authorized server 180 and the thin-client web-based application 130, such that much of the format and images, associated with the presentations on the screens of the ATM display that the customer sees and interacts with (via touch or keypad entry), are served from local cache of the ATM 110 to the thin-client web-based application 130 to reduce processing times and improve responsive times for the customer while transacting at the ATM 110.

These (above-discussed) embodiments and other embodiments are now discussed with reference to the FIGS. 2-4.

Figure 2:
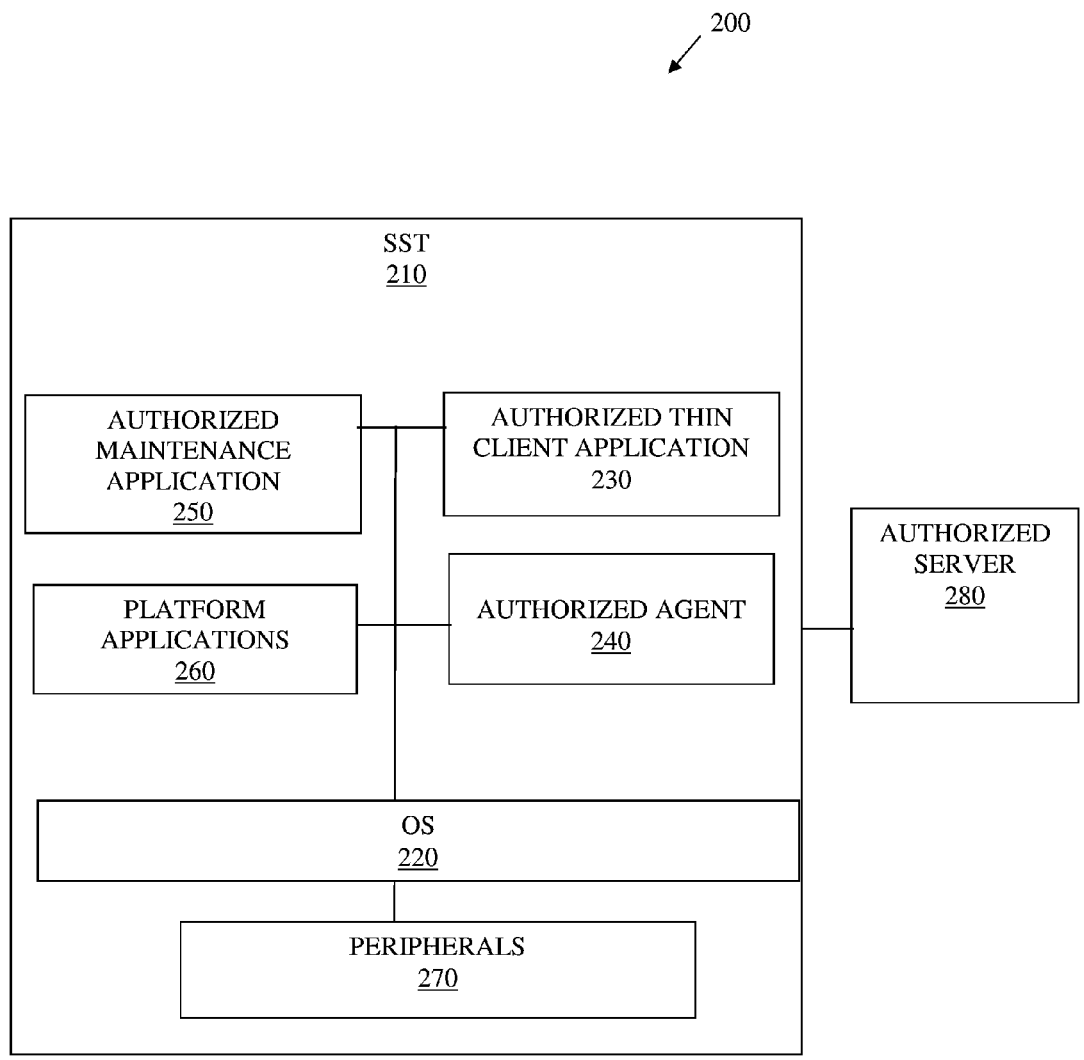
FIG. 2 is a diagram of a Self-Service Terminal (SST) thin client, according to an example embodiment.

FIG. 2 is a diagram of a SST thin client 200, according to an example embodiment. The components of the e SST thin client 200 are programmed and reside within memory and/or a non-transitory computer-readable medium and execute on one or more processors of an SST 410 (may also be referred to as SST terminal 410). The SST thin client 210 has access and can communicate over one or more networks; and the networks can be wired, wireless, or a combination of wired and wireless.

The SST thin client 210 includes an OS 220, an authorized thin-client application 230, and an authorized agent 240 (220-240 are software modules or set of modules that execute on one or more processors of the SST thin client 210). The SST 210 may also optionally include an authorized maintenance application 250 and platform applications 260 (250-260 software modules or set of modules that execute on one or more processors of the SST thin client 210). The executable instructions reside in memory and/or a non-transitory computer-readable storage medium accessible to the SST thin client 210.

The OS 220 is configured to restrict execution on the SST thin client 210.

In an embodiment, the OS 220 is the OS 110 of the FIG. 1.

The authorized thin client 230 is configured to access predefined peripheral devices 270 within the SST thin client 210 and an authorized server 280.

The authorized thin client 230 is only able to access the predefined peripheral devices 270. It is noted that the SST thin client 210 may have other peripheral devices (not shown in the FIG. 2) but the authorized thin client 230 has no access to these other peripherals.

In an embodiment, where security is a concern (e.g., access to a cash dispenser device of an ATM (SST 210), the access provided to the authorized thin client 230 will be made inherently secure to prevent rogue content (e.g., cross-site scripting attack, etc.) from accessing valuables within the ATM. This can be done my ensuring that any such access requires cryptographically secure authorization from the authorized server 280 to the peripherals 270.

In an embodiment, the authorized thin client 230 is configured to use a peripheral interface for interacting with the predefined peripheral devices 270 and a user interface for interacting with a customer interacting at the SST thin client. The peripheral interface one or more of the platform applications 260.

In an embodiment, the user interface is a web-based browser interface.

In an embodiment, the authorized thin client 230 is the thin-client web-based application 130 of the FIG. 1.

In an embodiment, the authorized thin client 230 uses web-based application authorized peripheral interfaces 140 to access the peripheral devices 270 (the web-based application authorized peripheral interfaces 140 acting as soft device drivers within the OS 220 for the peripheral devices 270).

The authorized agent 240 is configured to connect to the authorized server 280 and to manage updates to the OS 220, the updates received from the authorized server 280.

In an embodiment, the authorized agent 240 is the agent 150 of the FIG. 1.

In an embodiment, the authorized agent 240 is further configured to download content anticipated for use by the authorized thin client application 230, intercept requests from the authorized thin client application 230, and provide the content to the authorized thin client application 230 in response to the intercepted requests. So, the authorized agent 240 can act as a cache manager and/or a forward or transparent proxy for the authorized thin client application 230 with respect to the authorized server 280.

According to an embodiment, the authorized agent 240 is further configured to receive customization instructions from the authorized server 280 and apply those customizations to the authorized thin client application 230.

In an embodiment of the last embodiment, the authorized agent 240 is also configured to apply some customization instructions during initialization of the SST thin client 210 and other of the customization instructions on a transaction basis based on an identity of a customer transacting at the SST thin client 210. The frequency of customizations and conditions that warrant the customizations can be controlled by policy driven by the authorized server 280 in communications with the authorized agent 240. In some cases, the authorized server 280 can delegate policy conditions for dynamic evaluation to be performed by the authorized agent 240.

In an embodiment, the SST thin client 110 includes an authorized maintenance application 250 configured to execute on the SST thin client 110 to provide a variety of maintenance, testing, and diagnostic functions to an authorized user of the SST thin client 110. In an embodiment, the authorized maintenance application 250 is the local maintenance application 160 of the FIG. 1. In an embodiment, the authorized maintenance application 250 includes one or more of the peripheral device support applications 170 of the FIG. 1.

Figure 3:
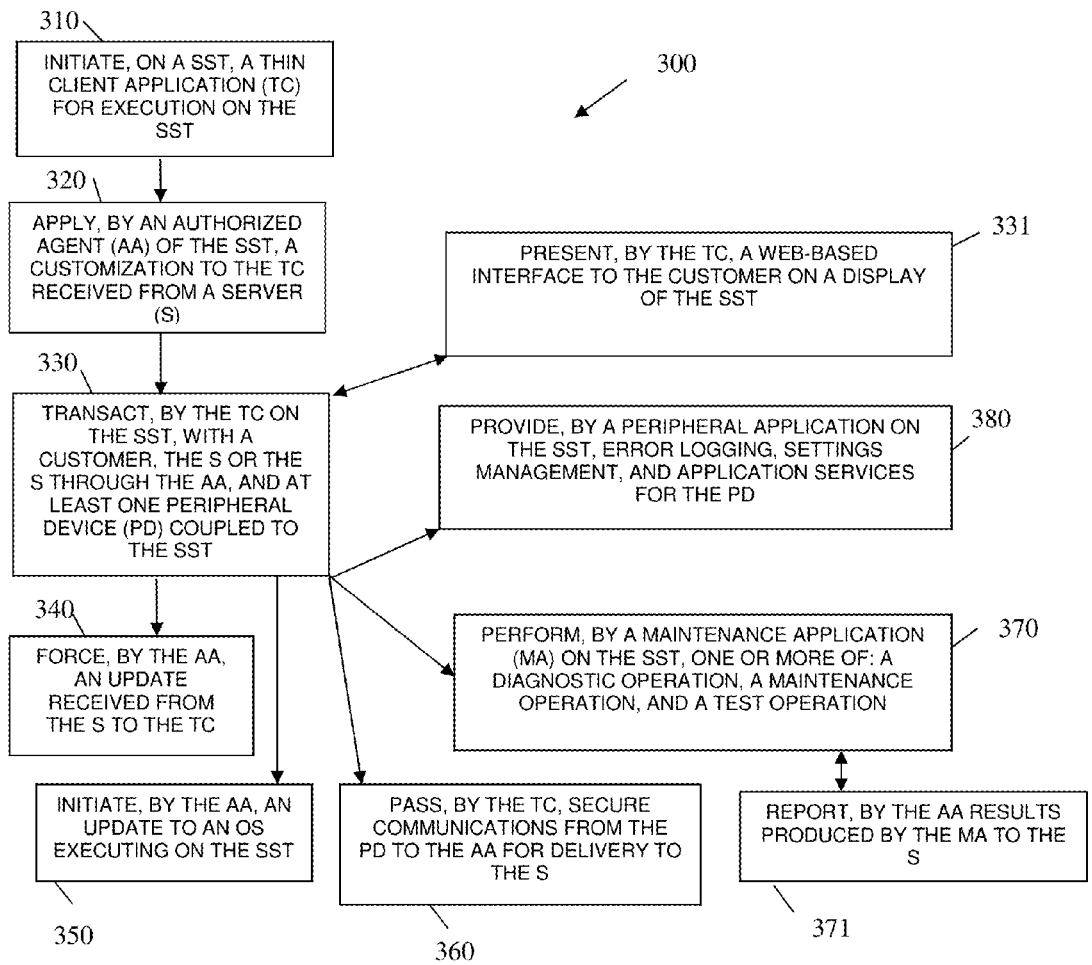
FIG. 3 is a diagram of a method for operating a SST as a thin client, according to an example embodiment.

FIG. 3 is a diagram of a method 300 for operating a SST as a thin client, according to an example embodiment. The software module(s) that implements the method 300 is referred to as an "SST thin client manager." The SST thin client manager is implemented as executable instructions programmed and residing within memory and/or a non-transitory computer-readable (processor-readable) storage medium and executed by one or more processors of an SST. The processor(s) of the SST that executes the SST thin client manager is specifically configured and programmed to process the SST thin client manager. The SST thin client manager has access to one or more networks during its processing. The networks can be wired, wireless, or a combination of wired and wireless.

In an embodiment, the SST that processes the SST thin client application is the ATM 110 of the FIG. 1.

In an embodiment, the SST that processes the SST thin client application is the SST 210 of the FIG. 2.

In an embodiment, the SST that process the SST thin client application is a kiosk.

In an embodiment, the SST thin client manager is one or more of the components of the FIG. 1.

In an embodiment, the SST thin client manager is one or more of the components of the FIG. 2.

At 310, the SST thin client manager, initiates a thin client application on the SST for execution on the SST.

In an embodiment, the thin client application is the thin-client web-based application 130 of the FIG. 1.

In an embodiment, the thin client application is the authorized thin client application 230 of the FIG. 2.

At 320, an authorized agent executing on the SST applies a customization to the SST thin client application received from a server. For example, authorized agent 240 interacts with authorized server 280 to customize features (function and user interface attributes and content) of the SST thin client application. This can occur while the SST thin client application is executing on the SST.

In an embodiment, the authorized agent is the agent 150 of the FIG. 1.

In an embodiment, the authorized agent is the authorized agent 240 of the FIG. 2.

At 330, the SST thin client application interacts on the SST with a customer (transacting at the SST), the server or the server through the authorized agent, and at least one peripheral device coupled to the SST. The SST thin client application interactions may be restricted to just predefined peripherals from a set of available peripherals to enhance security. Moreover, in some cases, the SST thin client application may only be able to communicate with: 1) the authorized agent, 2) the predefined peripherals within the processing environment of the SST, and 3) the server, which is external to the SST.

In an embodiment, the server is the server 180 of the FIG. 1.

In an embodiment, the server is the authorized server 280 of the FIG. 2.

According to an embodiment, at 331, the SST thin client application presents a web-based interface to the customer on a display of the SST for interaction with the customer.

In an embodiment, at 340, the authorized agent, forces an update received from the server on the SST thin client application.

In an embodiment, at 350, the authorized agent updates an OS executing on the SST.

In an embodiment, at 360, a maintenance application executing on the SST performs one or more of: a diagnostic operation, a maintenance operation, and a test operation. In an embodiment, the maintenance application is the local maintenance application 160 of the FIG. 1. In an embodiment, the maintenance application is the authorized maintenance application 250 of the FIG. 2.

In an embodiment of 360 and at 361, the authorized agent results produced by the maintenance application to the server.

In an embodiment, at 370, a peripheral application executing on the SST provides error logging, settings management for peripherals of the SST, and application services for the peripheral devices. In an embodiment, the peripheral application is the peripheral device support application 170 of the FIG. 1. In an embodiment, the peripheral application is one or more of the platform applications 260 of the FIG. 2.

Figure 4:
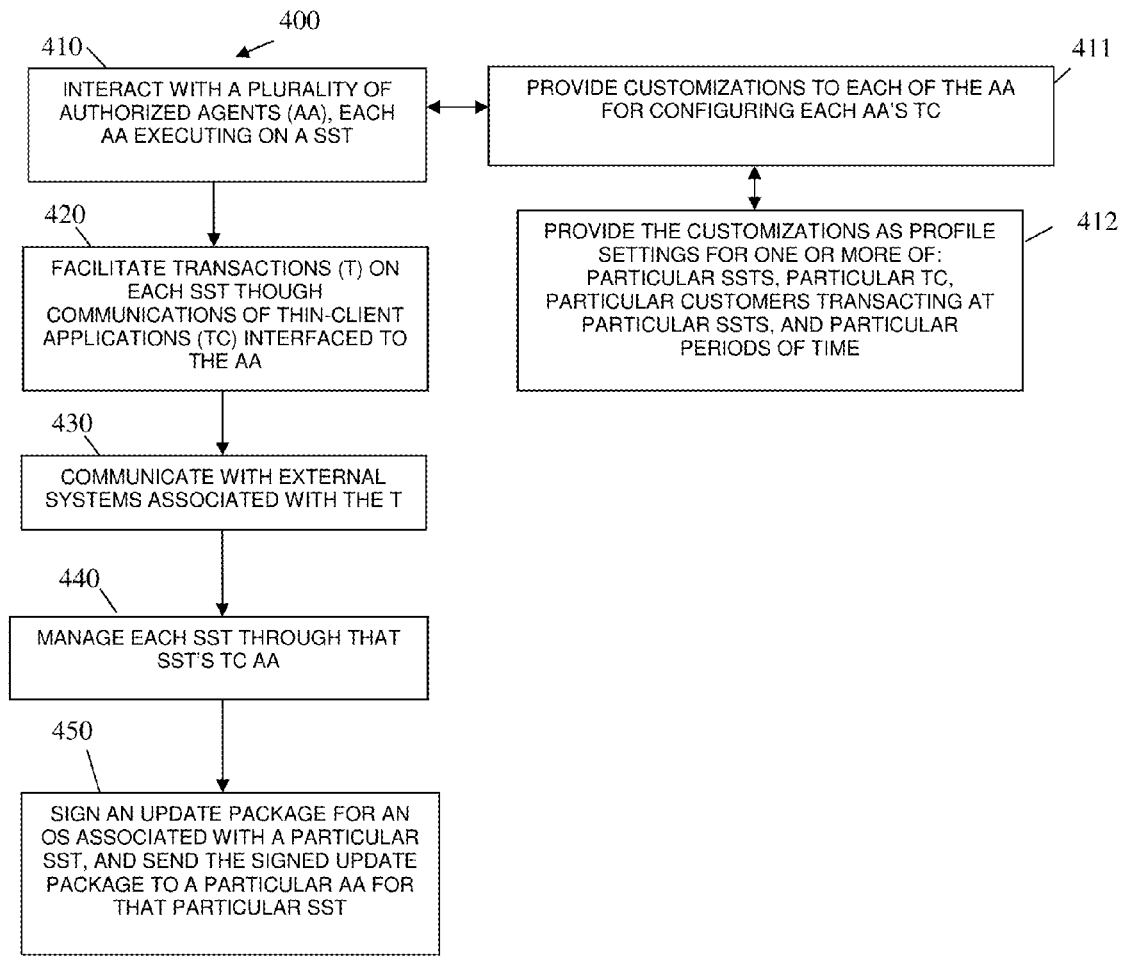
FIG. 4 is a diagram a method for operating a server that services SST thin clients, according to an example embodiment.

FIG. 4 is a diagram a method 400 for operating a server that services SST thin clients, according to an example embodiment. The software module(s) that implement the method 400 is referred to herein as an SST authorized server manager. The SST authorized server manager is implemented as executable instructions and programmed within memory and/or a non-transitory computer-readable (processor-readable) storage medium that executes on one or more processors of a server. The processors of the server are specifically configured to execute the SST authorized server manager. The SST authorized server manager can access one or more networks; the networks can be wired, wireless, or a combination of wired and wireless.

In an embodiment, the server that processes SST authorized server manager is the server 180 of the FIG. 1.

In an embodiment, the server that processed the SST authorized server manager is the authorized server 280 of the FIG. 2.

At 410, the SST authorized server manager interacts with a plurality of authorized agents, each authorized agent executing on an independent SST from the remaining agents.

In an embodiment, each authorized agent is an instance of the agent 150 of the FIG. 1.

In an embodiment, each authorized agent is an instance of the authorized agent 240 of the FIG. 2.

According to an embodiment, at 411, the SST authorized server manager provides customizations to each of the authorized agents for configuring each authorized agent's thin client application. In an embodiment, each thin client application is an instance of the thin-client web based application 130 of the FIG. 1. In an embodiment, each thin client application is an instance of the authorized thin client application 230 of the FIG. 2.

In an embodiment of 411 and at 412, the SST authorized server manager provides the customizations as profile settings for one or more of: particular SSTs, particular thin client applications, particular customers transacting at particular SSTs, and particular periods of time.

According to an embodiment of 412, the SST authorized server manager provides the customizations with conditions that each authorized agent is to dynamically evaluate to resolve when to apply a customization on a thin client application and what to apply as that customization.

At 420, the SST authorized server manager facilitates transaction on each SST through communications of the thin client applications, which are interfaced to or in communication with the authorized agents.

At 430, the SST authorized server manager communicates with external systems associated with the transactions. Such as particular financial systems or enterprise systems associated with the customer transactions at the SSTs.

At 440, the SST authorized server manager manages each SST through that SST's authorized agent.

According to an embodiment, at 450, the SST authorized server manager digitally signs an update package for an OS associated with a particular SST and sends the signed update package to a particular authorized agent for that particular SST. That authorized agent then validates the signature of the signed update package and forces an update to that OS on the particular SST by executing the update package. The SST authorized server manager can also do updates in a similar fashion for any application (including the authorized agent) executing on the SSTs to which the SST authorized server manager communicates with.

One now full appreciates how an SST can be modularized to operate that SST as a thin client of a server with improved customization, feature function delivery, processing efficiency, maintenance, support, fault tolerance, and diagnostic testing.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A Self-Service Terminal (SST), comprising:
a processor is configured with and to execute an operating system (OS) that is configured to restrict execution on the SST to authorized applications;
the processor is also configured with and to execute an authorized thin-client application that is configured to access only predefined peripheral devices from a set of available peripherals within the SST and an authorized server, wherein the thin-client application is further configured to execute code from a local SST processing environment and execute remote code received from the authorized server;
the processor is further configured with and to execute an authorized agent that is configured to connect to the authorized server and to manage updates to the OS received from the authorized server; and
a memory storing the thin-client application and the authorized agent, wherein the authorized agent is further configured to: (i) download content anticipated for use by the authorized thin-client application, (ii) intercept requests from the authorized thin-client application to the authorized server for content, and (iii) provide the content to the authorized thin-client application in response to the intercepted requests.

2. The SST of claim 1 further comprising, an authorized maintenance application configured to execute on the SST and operable to provide: maintenance, testing, and diagnostic functions to an authorized user of the SST.

3. The SST of claim 1 further comprising, platform-specific applications implemented as functions accessible within the OS.

4. The SST of claim 1, wherein the authorized agent is further configured to receive customization instructions from the authorized server and apply those customizations to the authorized thin client application.

5. The SST of claim 4, wherein the authorized agent is further configured to apply some customization instructions during initialization of the SST and other of the customization instructions on a transaction basis based on an identity of a customer.

6. The SST of claim 1, wherein the authorized thin client application is further configured to: use a peripheral interface for interacting with the predefined peripheral devices and use a user interface for interacting with a customer transacting at the SST.

7. The SST of claim 6, wherein the user interface is a web-based browser interface.

8. A method, comprising:
- initiating, on a Self-Service Terminal (SST), a thin-client application for execution on the SST;
- applying, by an authorized agent of the SST, a customization to the thin-client application received from a server, wherein applying further includes applying the customization to the thin-client application while the thin-client application continues to execute on the SST;
- downloading, by the authorized agent, content anticipated for use by the thin-client application;
- intercepting, by the authorized agent, requests from the thin-client application to the server for content;
- providing, by the authorized agent, the content to the thin-client application in response to the intercepted requests; and
- transacting, by the thin-client application on the SST, with a customer, the server or the server through the authorized agent, and at least one peripheral device coupled to the SST.

9. The method of claim 8 further comprising, forcing, by the authorized agent, an update received from the server to the thin-client application.

10. The method of claim 8 further comprising, initiating, by the authorized agent, an update to an operating system (OS) executing on the SST.

11. The method of claim 8 further comprising, passing, by the thin-client application, secure communications from the at least one peripheral device to one of: the authorized agent for delivery to the server and the server.

12. The method of claim 8 further comprising, performing, by a maintenance application on the SST, one or more of: a diagnostic operation, a maintenance operation, and a test operation.

13. The method of claim 12 further comprising, reporting, by the authorized agent results produced by the maintenance application to the server.

14. The method of claim 8 further comprising, providing, by a peripheral application on the SST, error logging, settings management, and application services for the at least one peripheral device.

15. The method of claim 8, wherein transacting further includes presenting, by the thin-client application, a web-based interface to the customer on a display of the SST.

16. A method, comprising:
- interacting, on a server, with a plurality of authorized agents, each authorized agent executing on a Self-Service Terminals (SST);
- facilitating, by the server, transactions on each SST though communications of thin-client applications interfaced to the authorized agents, wherein facilitating further includes providing customizations to at least one of the thin-client applications while that thin-client application continues to execute on the SST through instructions provided to at least one authorized agent;
- downloading, by at least one authorized agent, content anticipated for use by at least one of the thin-client applications;
- intercepting, by at least one authorized agent, requests from at least one of the thin-client applications to the server for content;
- providing, by at least one authorized agent, the content to at least one of the thin-client applications in response to the intercepted requests;
- communicating, by the server, with external systems associated with the transactions; and
- managing, by the server, each SST through that SST's authorized agent.

17. The method of claim 16 further comprising, signing, by the server, an update package for an operating system (OS) associated with a particular SST, and sending the signed update package to a particular authorized agent for that particular SST.

18. The method of claim 16, wherein interacting further includes providing customizations to each of the authorized agents for configuring each authorized agent's thin client application.

19. The method of claim 18, wherein providing further includes providing the customizations as profile settings for one or more of: particular SSTs, particular thin client applications, particular customers transacting at particular SSTs, and particular periods of time.

* * * * *